FIG. I

INVENTOR
Delmer W. Wagner

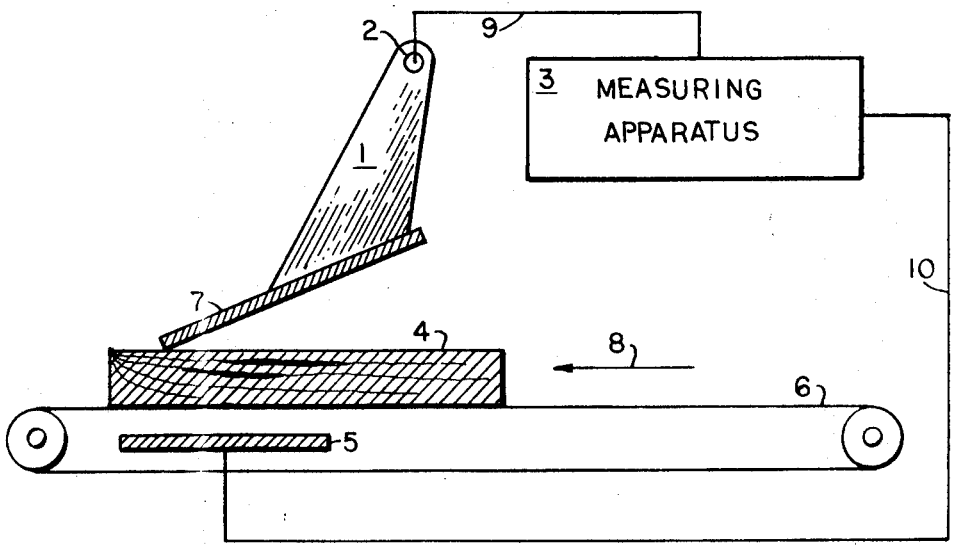
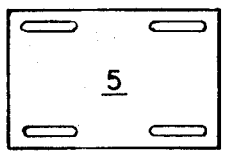
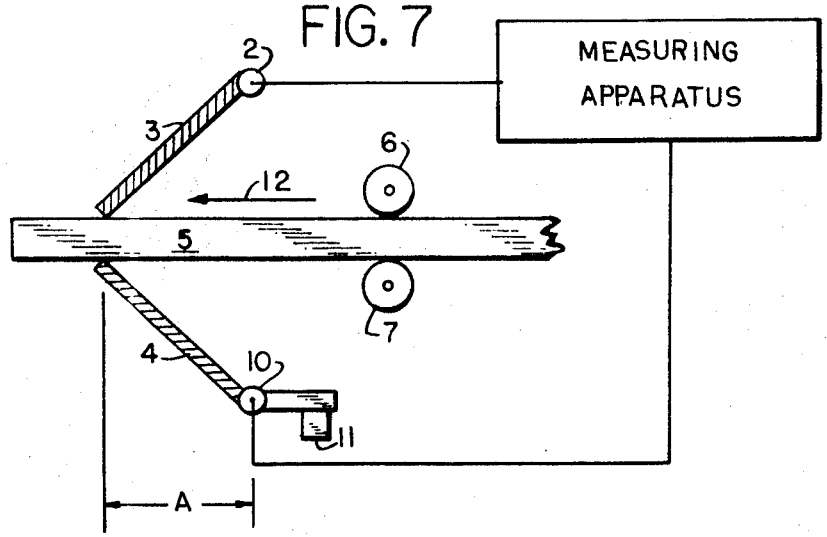

Aug. 4, 1970

D. W. WAGNER 3,523,243

MOISTURE MEASUREMENT DEVICE INSENSITIVE TO
THICKNESS OF MATERIAL UNDER TEST

Filed Oct. 31, 1967

INVENTOR
Delmer W. Wagner

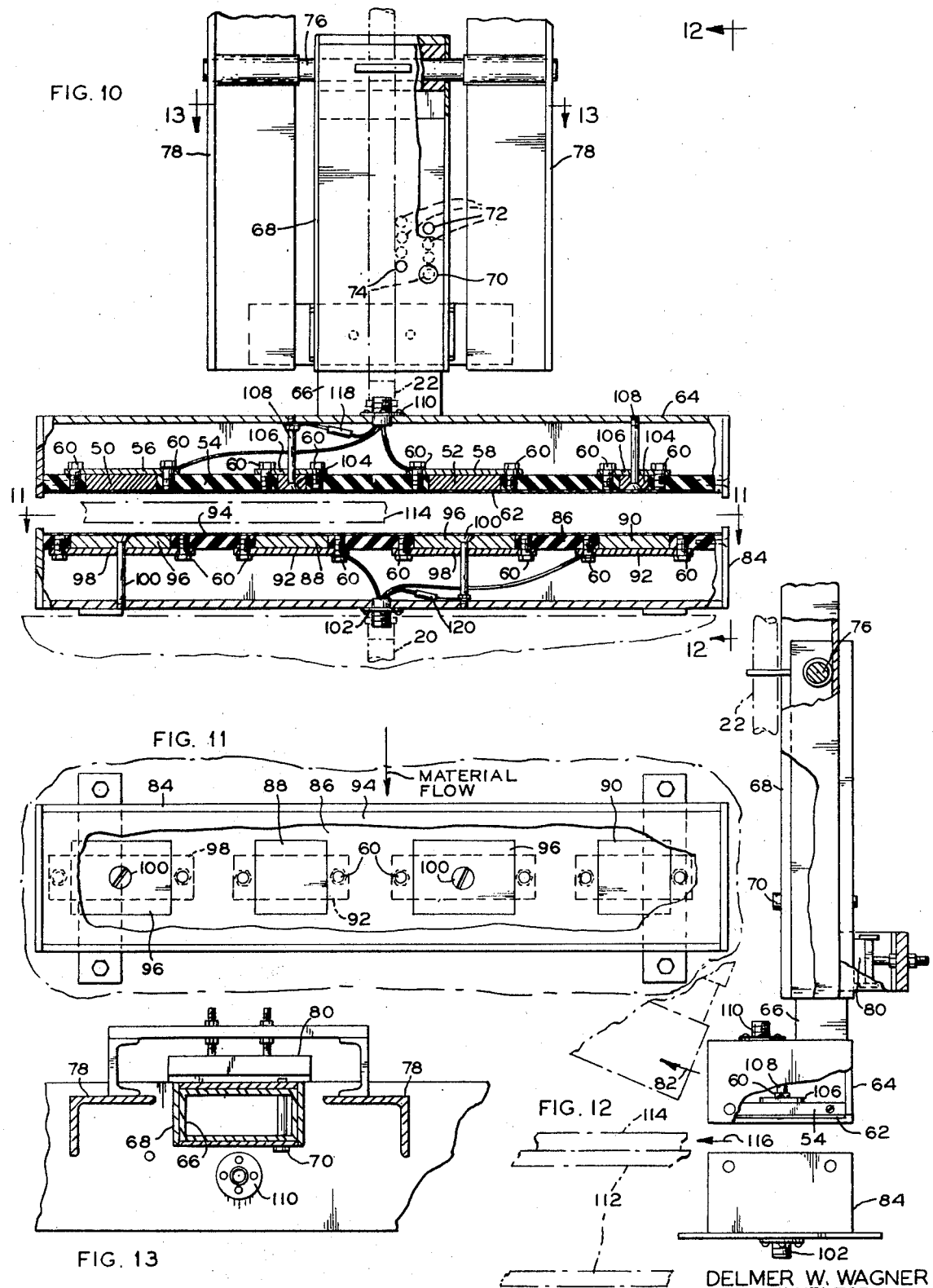

Aug. 4, 1970  D. W. WAGNER  3,523,243
MOISTURE MEASUREMENT DEVICE INSENSITIVE TO
THICKNESS OF MATERIAL UNDER TEST
Filed Oct. 31, 1967  6 Sheets-Sheet 6

DELMER W. WAGNER
INVENTOR

BY
BUCKHORN, BLORE, KLARQUIST & SPARKMAN
ATTORNEYS

United States Patent Office 3,523,243
Patented Aug. 4, 1970

3,523,243
MOISTURE MEASUREMENT DEVICE INSENSITIVE TO THICKNESS OF MATERIAL UNDER TEST
Delmer W. Wagner, Rte. 1, Box 176,
Terrebonne, Oreg. 97760
Continuation-in-part of application Ser. No. 511,804, Dec. 6, 1965. This application Oct. 31, 1967, Ser. No. 683,080
Int. Cl. G01r 27/26
U.S. Cl. 324—61
19 Claims

ABSTRACT OF THE DISCLOSURE

An apparatus for measuring the moisture content of material such as lumber, veneer, plywood, hardboard, paper pulp, and the like includes electric signal means and a pair of conductors disposed in spaced relation to the aforementioned material. The conductors form a capacitive device for interconnection with the electric signal means, with the material being tested providing a dielectric for the capacitor. The conductors are mounted such that thickness changes in the material are compensated. For example, one of the conductor means is pivotally supported so that passage of material of different thicknesses changes the projected area between the conductor means. In the case of another embodiment, the conductor means are spaced or staggered along the material so that a major proportion of the electric path between the conductor means extends along a substantially fixed distance in the material rendering the overall measurement less susceptible to changes in material thickness.

CROSS-REFERENCE TO RELATED APPLICATION

This application is a continuation-in-part of my application Ser. No. 511,804, filed Dec. 6, 1965, now abandoned, for Moisture Detector.

BACKGROUND OF THE INVENTION

A number of devices have heretofore been proposed for detecting moisture content in wood products and the like. A number of such devices make contact with the material, either conductively, or employing the material as a dielectric between two capacitor plates also contacting the material. In the case of the capacitive arrangement, the plates are suitably connected in a bridge or other sensitive balancing arrangement whereby changes in capacitance produced by changes in moisture can be detected, it being understood that such changes in capacitance are frequently small. Such apparatus is suitable for measuring the moisture content of material of uniform thickness, but when the spacing between the plates is changed as the material thickness changes, the output indication tends to become inaccurate.

SUMMARY OF THE INVENTION

According to the present invention a moisture detecting device is provided wherein little or no physical contact is made with the material such that minimum interference with the material is produced and so that relatively large quantities of such material can be moved in spaced relation to detection means. Moreover, steps are taken to compensate for material thickness and/or position of the material so that the moisture indicating output is substantially independent of material thickness and/or position.

According to the present invention, a pair of conductors or plates are spaced in facing relation to material under test, and these conductors are interconnected with electric signal means so that the electrical properties of the path in the material, and therefore the moisture in the material, may be ascertained. The conductors or plates are mounted to include means for compensating for the effect of thickness changes and the like, e.g. as the material is conveyed relative to such conductors or plates.

In accordance with one embodiment, one of the plates is pivotally mounted and is moved by the material in a manner such that material of greater thickness increases the projected area between two facing plates. In accordance with another and preferred embodiment, the conductors are staggered or offset relative to one another by a fixed distance along the material, e.g. in either a lateral direction or in the direction of movement of the material, such that an electrical path between the conductors or plates is formed which predominately extends along or through a length of the material under test, whereby the effect of thickness changes, or changes in position of the material, have a substantially reduced effect on the output indication.

It is accordingly an object of the present invention to provide an improved moisture detecting apparatus for more accurately ascertaining the moisture content of material such as lumber, veneer, plywood, hardboard, paper pulp, and the like.

It is another object of the present invention to provide an improved moisture detecting apparatus for providing rapid and automatic detection of moisture in material which may be passed relative thereto.

It is a further object of the present invention to provide improved moisture detection apparatus including elements disposed in non-contacting relation with material being tested, and wherein the test indication is to a large extent independent of thickness variations and positional variations in such material.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection wtih the accompanying drawings.

DRAWINGS

FIG. 5 is a cross sectional illustration of capacitor means according to the present invention mounted in such a way as to compensate for thickness variations in material under test;

FIG. 6 is a bottom view of a portion of the FIG. 5 apparatus;

FIG. 7 is a cross sectional view illustrating a variation of the FIG. 5 apparatus;

FIG. 10 is an end view partially in cross section of conductor means employed according to a preferred embodiment of moisture detection apparatus of the present invention;

FIG. 11 is a plan view of a portion of the FIG. 10 apparatus taken at 11—11 in FIG. 10, and partially broken away;

FIG. 12 is a side view of the FIG. 10 apparatus;

FIG. 13 is a cross sectional view of the FIG. 10 apparatus taken at 13—13 in FIG. 10;

DETAILED DESCRIPTION

Figure 1:
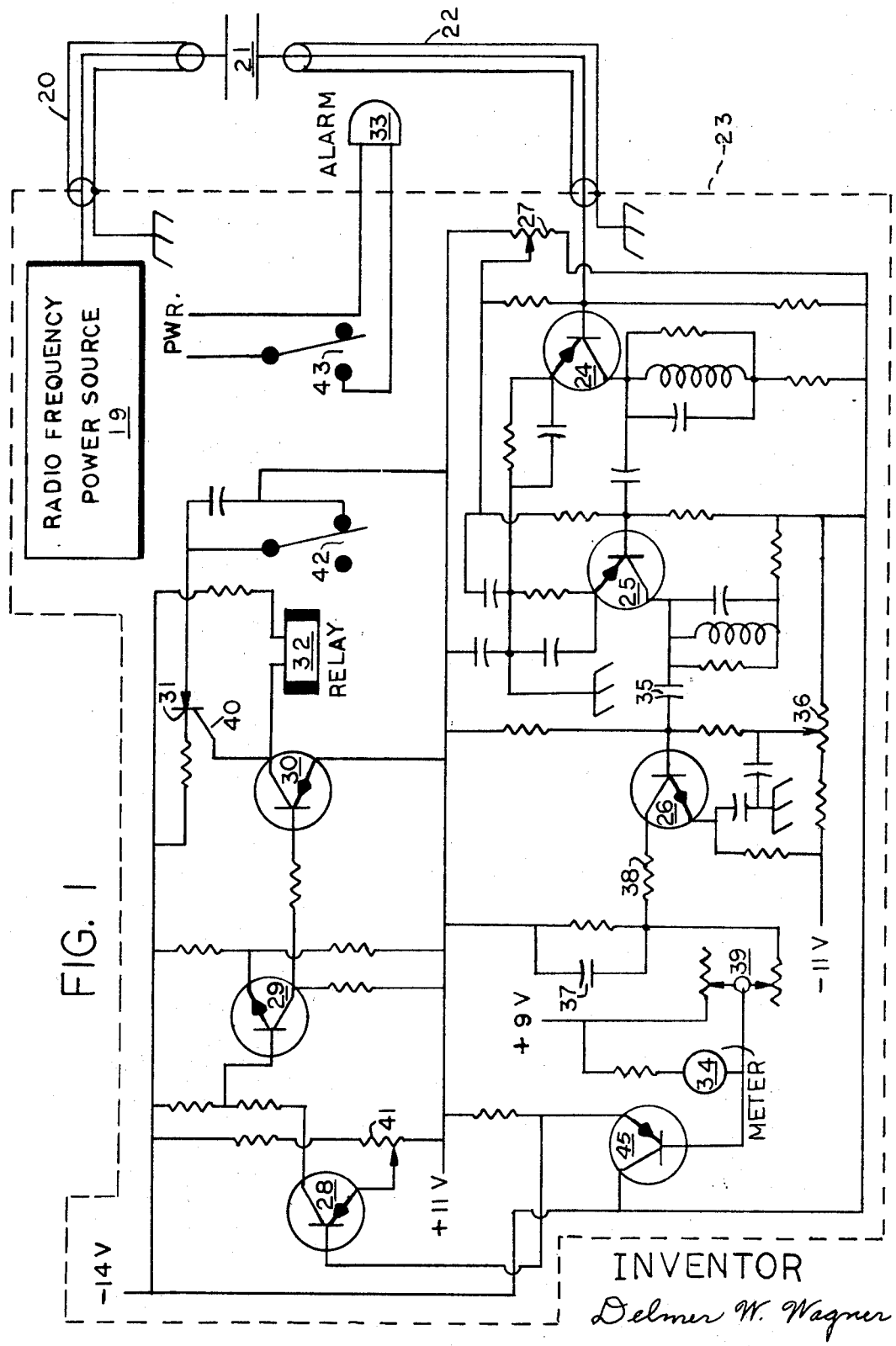
FIG. 1 is a schematic circuit diagram of an electric signal means employed with the present invention.

Referring to FIG. 1, illustrating electric signal means suitably employed with the apparatus of the present invention, a radio frequency power source 19 delivers a relatively high frequency signal to a coaxial cable 20 connected to one plate of a detecting capacitor 21, wherein the latter may be disposed in non-contacting relation to material under test. Power source 19 suitably includes a radio frequency oscillator and such amplification means as may be found desirable in order to provide a suitable output signal level at detecting capacitor 21. In one instance the power source operated at a frequency of approximately 4 megacycles, with the power input to the final stage of amplification being between five and ten watts. The remaining plate of capacitor 21 is connected through coaxial cable 22 to a signal-receiving means suitably housed in the same cabinet 23 with power source 19. The signal-receiving means includes amplifying transistors 24 and 25 cascaded in that order for delivering an amplified output through coupling capacitor 35 to the base of transistor 26.

Transistors 24 and 25 are provided with a bias adjustment potentiometer 27 having its movable tap coupled to the bases of transistors 24 and 25, and being effective for generally reverse biasing transistors 24 and 25 to bring about what may be termed class C operation. Potentiometer 27 provides an adjustable operating point for the circuit and is employed as hereinafter more fully described as a lower calibration control. Feedthrough of signal across capacitor 21, with no material disposed between the plates thereof, can be rejected by adjustment of potentiometer 27, whereby a received signal is amplified only when material, or more particularly moist material, is disposed between the plates of capacitor 21.

The amplified signal is detected or rectified in transistor 26, with collector resistor 38 performing the function of a peak current limiter. The output is filtered or smoothed by capacitor 37 joining the remote end of resistor 38 to a point of positive potential. Control 39 receives the output signal from transistor 26, at the juncture of resistor 38 and capacitor 37, and delivers the same to meter 34 as well as to emitter follower transistor 45. Control 39 is in the nature of an attenuator pad and provides a constant load resistance for transistor 26 while at the same time providing a variable adjustment of the output of transistor 26 as delivered to meter 34 and transistor 45. Control 39 is employed to set the upper calibration of the apparatus in a manner hereinafter more fully described. Potentiometer 36 is utilized to adjust the bias at the base of transistor 26 and may be employed as a meter zeroing control as also hereinafter more fully described.

Emitter follower transistor 45 drives transistors 28, 29, and 30 in cascade in an alarm circuit. The collector of transistor 30 is connected to one terminal of a relay coil 32 which operates contacts 42. The collector of transistor 30 is also connected to the control gate 40 of a silicon controlled rectifier 31, the latter having its cathode coupled to a negative supply terminal and having its anode coupled to one of the contacts 42. The circuit operates such that when predetermined conduction takes place in the collector-emitter path of transistor 30, silicon controlled rectifier 31 rapidly responds and provides a conductive path through gate 40 for a predetermined period of time. The transistor 30 is thereby retained in conduction until relay coil 32 has time to operate contacts 42.

Contacts 43 are also operated by relay coil 32 and function to connect a source of power to an alarm 33. Alarm 33 may consist of any suitable device for sounding an audible alarm, or providing a visual indication or mark on the tested material. As will be understood, alarm 33 is suitably mounted outside of cabinet 23.

The bias for transistor 28 is controlled by potentiometer 41, the movable arm of which is connected to the emitter electrode of transistor 28, and this potentiometer set the point at which the instrument will produce an alarm. Thus, when material disposed between the plates of capacitor 21 is sufficiently moist so that sufficient radio frequency energy is coupled therebetween to overcome the bias of transistors 24 and 25, the signal will be amplified by transistors 24 and 25, and a filtered substantially D.C. output will be produced across the capacitor 37 at the output of transistor 26 for supplying D.C. current to meter 34. Meter 34 may be calibrated to register the moisture content of the material. A given alarm point can be selected by adjustment of potentiometer 41 so that when a given level of moisture is reached, relay coil 32 operates contacts 43 sounding alarm 33 or producing some other output indication.

Figure 2:
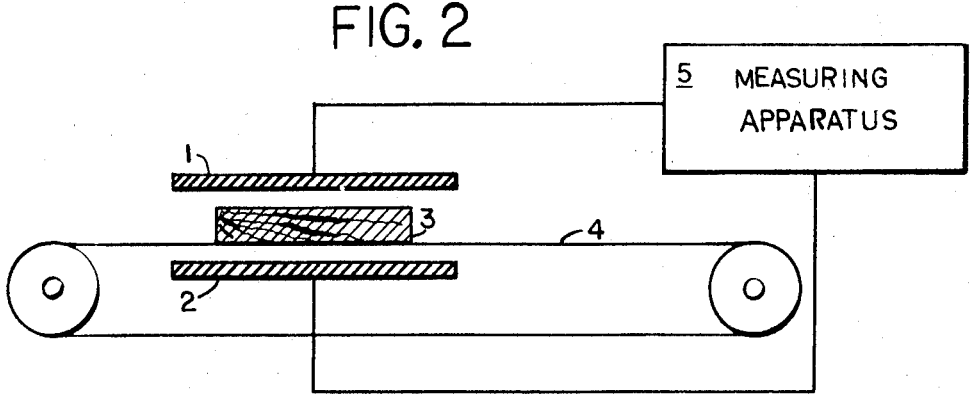
FIG. 2 is a cross sectional illustration of a capacitor plate device that may be connected to the FIG. 1 circuit.

FIG. 2 illustrates, in simplified fashion, a detecting capacitor, 21, for connection with the FIG. 1 circuit. It will be understood that the FIG. 2 illustration is employed herein primarily to aid an understanding of circuit operation rather than to illustrate specific embodiments of the present invention.

Referring to FIG. 2, the detecting capacitor therein illustrated is suitably of substantially rugged construction and is mounted at the point where measurement of the moisture of a particular material is to be made. It includes parallel spaced conductive plates 1 and 2 between which material 3, for example a piece of lumber, may be moved upon a conveyor 4. Plates 1 and 2 are not only spaced from one another, but are also desirably spaced relative to and on either side of material 3. The plates are connected respectively to terminals of the electrical signal means or measuring apparatus 5, which may suitably comprise the electric signal means as housed in cabinet 23 in FIG. 1. The detector apparatus operates on the principal of transfer of radio frequency power between capacitor plates 1 and 2 along an electrical path including a portion of the material under test. Placing material of different moisture content between the plates varies the transfer of power in proportion to the amount of moisture present in the material, through varying the electrical properties of the electrical path between the plate means, and it has not been found necessary to make extensive physical contact between the plates and the material. Therefore, interference with the conveyance of material is avoided and the moisture content may be rapidly measured on an "on-line" basis. Since the plates of the FIG. 2 do not contact the material, but rather remain fixed relative to each other, the output readings produced are less affected by variations in material thickness than would be the case if the plates contacted the material and were moved relative to one another with changes in material thickness.

However, the amount of signal transfer between the plates of a sensing or detecting capacitor 21, as illustrated in FIG. 1 or as more particularly illustrated in FIG. 2, still tends to be affected by the thickness of the tested material. Thus, referring to FIG. 2, if plates 1 and 2 are simply juxtaposed directly opposite one another on opposite sides of material 3, the thickness of the material 3 that may be disposed between plates 1 and 2 can affect the output of the electric signal means or measuring apparatus. For example, a moist unit of material placed between plates 1 and 2 provides a shorter or longer partially conductive path therebetween depending on the material thickness.

Troublesome thickness variation in the material may be encountered not only in the consecutive testing of various pieces of material, but also within a single large piece of material from one location to another. Thus, if a unit of material 3 is appreciably larger than the juxtaposed areas of plates 1 and 2, and is moved on conveyor 4 relative to plates 1 and 2, the output reading can vary as differening thicknesses of material are moved between the plates, even though the moisture content or density, and therefore acceptability or non-acceptability, remains constant. It is desired that the signal means or measuring apparatus measure moisture content or density without being appreciably affected by material thickness variations and roughness. Therefore, other means are preferably employed for providing moisture measurements less affected by thickness variations in the material tested. In accordance with the present invention, at least one conductor plate means of the detecting capacitor is desirably mounted to include means for adjusting for the effect of material thickness changes.

Referring to the embodiment of FIG. 5, one such detecting capacitor according to the present invention includes a first plate 5 disposed on one side of conveyor 6, the latter carrying material 4 in the direction designated by arrow 8. Plate 5 is disposed in spaced relation to material 4. An opposite plate 7 is positioned above material 4 with the major portion of the area of plate 7 facing material 4 and being disposed in non-contacting relation with material 4, while a forward edge of plate 7 contacts the material, e.g., the lower left-hand edge of plate 7 in FIG. 5. Plate 7 is joined to arm 1 pivotable about an axis at 2 rearwardly above and substantially laterally parallel to the face of plate 7, with such axis also extending in a direction laterally parallel and opposite to plate 5. Arm 1 is joined to the back of plate 7 and extends from the right side thereof as viewed in FIG. 5 so that plate 7 normally hangs downwardly to the left. As material 4 is moved on conveyor 6 in the direction indicated by arrow 8, the left-hand edge of material 4 engages the lower left hand edge of plate 7 causing plate 7 to be turned in a clockwise direction about the axis 2 until the lower left-hand edge of plate 7 reaches the top surface of material 4. Thus plates 7 and 5 move farther apart as material engages plate 7, tending to decrease the capacity therebetween. However, plate 7 is also mounted as indicated above for changing its angular relation relative to plate 5 as material 4 is encountered, whereby the angle of plate 7 is decreased relative to the plane of plate 5, or relative to the direction of a parallel attitude between plates 7 and 5. Plate 5 is also preferably foreshortened relative to plate 7 toward the right in FIG. 5, i.e. toward and under the pivotal axis of plate 7.

Thus, as material 4 becomes fully positioned under plate 7, as illustrated, plate 7 will have moved to a position to accommodate material 4 whereby the facing projected area between plates 5 and 7 will have changed as a function of the thickness of material 4. Material of a given thickness moves plate 7 in a clockwise direction through a first angle, while yet thicker material causes plate 7 to move through a greater angle, presenting an increased area thereof facing or projectable upon plate 5. The capacitance between plates 7 and 5 is a function not only of the spacing therebetween, but also of the facing area therebetween, tending to increase as this area increases, and tending to decrease as this area decreases. Therefore, although thicker material moves the plate 7 and 5 farther apart, the foregoing means of mounting plate 7 produces an at least partially counteracting effect for providing desired compensation. The degree of compensation is adjustable by movement of plate 5 to the right or left. For this purpose, plate 5 is provided with slotted mounting holes as illustrated in FIG. 6. Appropriate fastener devices (not shown) may be tightened down through these mounting holes when a given position for plate 5 is selected. As in the previously described apparatus, plates 5 and 7 are connected respectively to terminals of an electric signal means for measuring apparatus 3, here by means of conductors 9 and 10.

Figure 9:
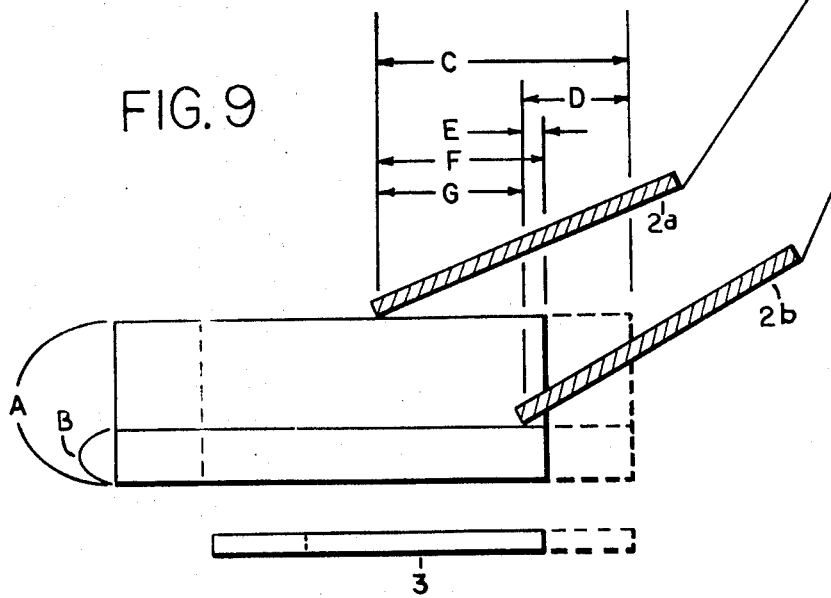
FIG. 9 is a diagram illustrating the thickness compensating effect of the FIG. 5 apparatus.

The FIG. 9 diagram more clearly illustrates the manner in which compensation is provided by the FIG. 5 apparatus. In FIG. 9, a thin board is represented at B, and a thick board is represented at A. Plate 2 (corresponding to plate 7 in FIG. 5) pivots swingably from point P and reaches position 2a with the thicker board located thereunder, but only reaches position 2b if thin board B is located thereunder.

Two adjustable positions for a plate 3 (corresponding to plate 5 in FIG. 5) are respectively represented by full and broken lines while corresponding positions for the boards are represented by solid lines and broken lines. With plate 3 in the position shown in full lines, it will be seen that the ratio of projected area between the two plates for the two boards, A and B, is equal to the ratio of distances F to E, being approximately 7 to 1. With plate 3 in the position shown in broken lines, the ratio of projected area between the plates for the two boards is approximately 2¼ to 1. By moving plate 3 to the left or to the right, a point can be found where the correct amount of compensation is provided so that the output reading is primarily a function of moisture content or moisture density of the boards, with a substantial decrease in the effect of board thickness on the output reading.

In FIG. 7 a device similar to the FIG. 5 detecting capacitor is illustrated, but in this case includes two facing swingably pivoted plates 3 and 4 connected to terminals of a signal means or measuring apparatus. Shafts 2 and 10 provide pivots for plates 3 and 4. In FIG. 7 the feed rolls 6 and 7 comprise the conveyor means for moving the material 5 in the direction indicated by arrow 12. Placing thicker material between plates 3 and 4 increases the distance A providing more common or projected area between the plates, tending to increase the amount of power transfer which would be decreased more rapidly if the plates were moved apart in a parallel manner. Counterweight 11 urges plate 4 upwardly towards material 5.

Figure 3:
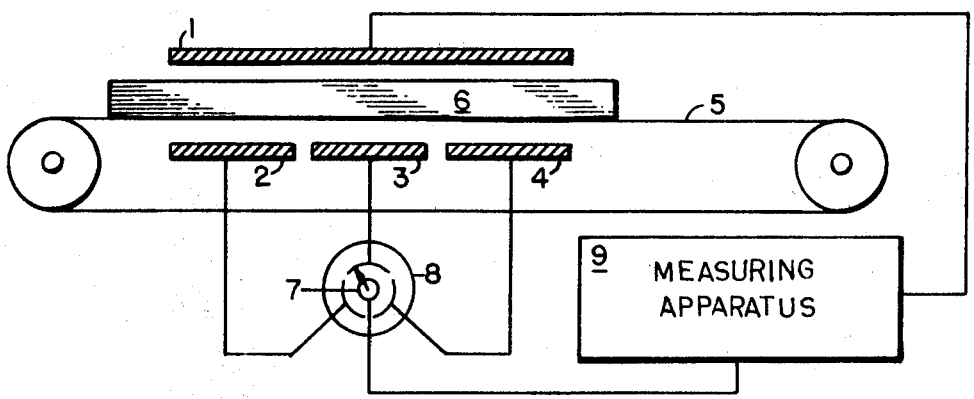
FIG. 3 is a cross sectional illustration of apparatus for detecting wet pockets in material.
Figure 4:
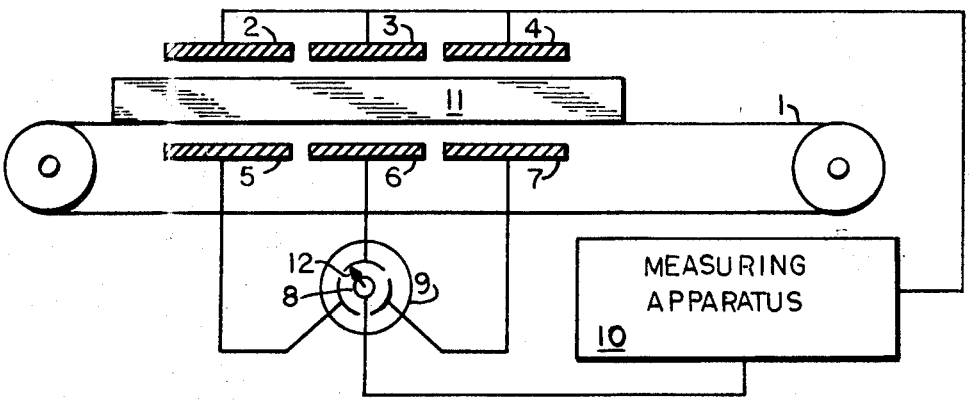
FIG. 4 is a cross sectional view illustrating a variation of the FIG. 3 apparatus.

Provision is made according to the present invention for locating wet spots in wood or other material. This is accomplished by dividing a detecting capacitor into a plurality of detecting capacitors and measuring by said capacitors the moisture content in small areas of the material. The plural capacitors are connected one at a time or in groups to a measuring apparatus wherein the average overall scaled output indicates an average of the measured moisture content of the material. However, the alarm, for example alarm 33 in FIG. 1, responds to extremes in moisture content so that if a wet pocket is encountered between the plates of one of the plural detecting capacitors, the indication therefor is not lost in an overall average. A plurality of such detecting capacitors is illustrated in FIG. 3 having a common plate 1 connected to one terminal of the electric signal means or measuring apparatus 9, and having a plurality of oppositely disposed plates 2, 3, and 4 connected to segments of a rotary switch 8. A shaft 7, is driven by a drive motor (not shown) for rotating a contact brush for making successive connection with the aforementioned segments. Again, material 6 is passed between the coupling capacitor plate arrangement upon conveyor 5. As shaft 7 is rapidly rotated, the plates 2, 3, and 4 are successively connected to the measuring apparatus 9 so as to detect wet spots as may be present in alignment with plates 2, 3, and 4, respectively. A similar apparatus is illustrated in FIG. 4 wherein separate plates 2, 3, and 4 are disposed on a first side of material 11, supported on a conveyor 1, with such plates being connected in common to a first terminal of measuring apparatus 10. Plates 5, 6, and 7, opposite plates 2, 3, and 4 respectively, are connected to segments of a rotary switch 9 having a segment contacting brush 12 mounted for rotation on a motor driven shaft 8, brush 12 being connected to the remaining terminal of measuring apparatus 10.

The individual detecting capacitor means in FIGS. 3 and 4 are illustrated as parallel plate capacitor means disposed in spaced relation to the material under test after the manner of the detecting capacitor means illustrated in FIG. 2. It is to be understood, however, that more complex detecting capacitor means, e.g., for compensating for material thickness variations, may be substituted therefor. For example, three detecting capacitor means of the type illustrated in FIG. 5 may suitably be employed in place of the capacitor means illustrated in FIG. 4. Also, a plurality of other detecting capacitor means adapted for compensating for material thickness variations and the like, and as hereinafter more fully described, may be substituted for the capacitor means illustrated in FIGS. 3 and 4.

A mechanically rotating switching means is illustrated for consecutively connecting capacitor means to a measuring apparatus in FIGS. 3 and 4 for detecting wet pockets and the like in the material. However, electronic switching apparatus is suitably substituted therefor. Such an apparatus is illustrated in the schematic diagram in FIG. 8 wherein transistors 5 and 6 are cross coupled in a manner to provide a free running multivibrator. In this circuit, resistors 21 and 22 comprise collector load resistors interposed between the respective collectors of transistors 5 and 6 and a source of positive voltage, while capacitors 3 and 4, connected between each collector and the base of the opposite transistor, provide the cross coupling means. The emitters of transistors 5 and 6 are connected to a negative potential point. Transistors 7 and 8 provide emitter follower output means for the multivibrator, and have their respective base electrodes connected to the collector electrodes of transistors 5 and 6. The emitter of transistor 7 is connected through a series circuit comprising resistor 9, choke 11, diode 15, and choke 18, disposed in that order, to a zero voltage or ground connection. Similarly, the emitter of transistor 8 is connected through the series combination of resistor 10, choke 12, diode 16, and choke 18, and also to the zero volt or ground connection. Diodes 15 and 16 are oriented with their cathode terminals connected in common to the ungrounded end of choke 18. A first input capacitor 13 couples input terminal 1 to the anode of diode 15 while a second input capacitor 14 couples input terminal 2 to the anode of diode 16. Output capacitor 17 couples the common diode cathode connection to output terminal 19. In this circuit, resistors 9 and 10 are current limiters, and chokes 11, 12, and 18 offer a high impedance to the transfer signal or square wave generated by the operation of the multivibrator. Capacitors 13, 14, and 17 offer a low impedance to a moisture indicating signal and function as D.C. blocking capacitors.

Figure 8:
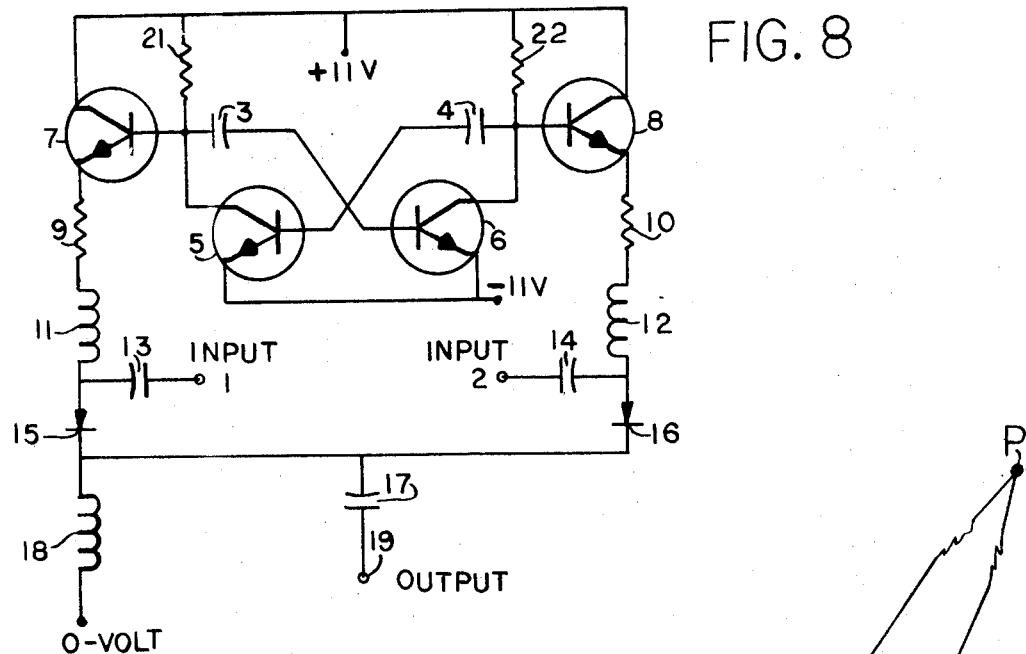
FIG. 8 is a schematic circuit diagram of electronic switching means which may be employed with the apparatus of FIG. 3 or FIG. 4.

Input terminals 1 and 2 in the FIG. 8 circuit are suitably connected to different capacitor plates as, for example, plates 5 and 6 in the FIG. 4 apparatus, while output terminal 19 is connected to a terminal of measuring apparatus 10. Suitably such terminal of the measuring apparatus 10 corresponds with a receiving terminal thereof or the input connection to transistor 24 in FIG. 1 through coaxial cable 22. As the multivibrator operates, a square wave is produced at the collector electrodes of transistors 5 and 6 with the square wave potential at the collector of transistor 5 being the inverse of the square wave potential at the collector of transistor 6. Transistors 7 and 8 are alternately rendered conducting and non-conducting by the square wave applied to their respective base electrodes, and function to alternately render diodes 15 and 16 conducting and non-conducting. Therefore, during a first square wave half-cycle, the input applied to terminal 1 is coupled through capacitor 13, diode 15, and capacitor 17 to output terminal 19. On the next square wave half-cycle the input applied to input terminal 2 is coupled through capacitor 14, diode 16, and capacitor 17 to output terminal 19. It is thus seen that the FIG. 8 circuit is suitably employed to alternately and consecutively connect a pair of detecting capacitor means to a measuring apparatus. As can readily be appreciated, a ring counter or more complex switching circuit can be used for switching a larger number of detecting capacitors.

FIGS. 10, 11, 12, and 13 illustrate a first detecting capacitor apparatus according to a preferred embodiment of the present invention. It is understood this apparatus may be employed in connection with the FIG. 1 circuit, or with a similar circuit, at the location of capacitor 21. Coaxial cables 20 and 22 correspond to similarly numbered cables in FIG. 1. Cable 22 includes a central conductor connected to conductors or plates 50 and 52 suitably formed of steel and secured into matching apertures in a panel of insulating dielectric material 54, preferably formed of Micarta. Plates 50 and 52 are joined to straps 56 and 58 in turn secured to the Micarta panel by means of screws 60 threadably received in tapped holes in the Micarta panel. Plates 50 and 52 have a thickness approximately equal to that of the Micarta panel 54, but both Micarta panel 54 and plates 50 and 52 are desirably covered by a thin layer 62 of Micarta which in this embodiment is approximately $\frac{1}{16}$ inch thick.

Panel 54 is joined to metal shield cover 64, with layer 62 providing the lower surface of closure for shield cover 64. Shield cover 64 is supported on an adjustable upright member 66 slidably received within hingedly swingable member 68. As most clearly seen in FIG. 13, upright member 66 is secured at a given vertical position within member 68 by means of a pin 70. A plurality of vertically staggered apertures 72 are provided in member 66, as indicated in FIG. 10, with a pair of apertures 74 being provided in member 68 through which pin 70 may be extended. This vertical positioning adjustment permits placement of shield cover 64, and therefore of plates 50 and 52, in relatively close spaced relation to material being tested and which may pass thereunder.

Member 68 is rotatable upon a horizontal shaft 76 joined to vertical supports 78 at either end thereof. Vertical supports 78, which may be attached to the frame of a conveyor apparatus, have joined thereto an adjustable stop 80. Member 68 carrying member 66, with shield cover 64 extending from the lower end thereof, may be swung to the left as indicated by arrow 82 in FIG. 12, but normally would be constrained in a vertical position as the weight of the apparatus bears against stop 80.

Below shield cover 64 is disposed a second metal shield cover 84 having an upper closed surface comprising a dielectric insulating panel 86 suitably formed of Micarta. Conductors or plates 88 and 90, suitably formed of steel, are received in matching apertures in panel 86, being joined to straps 92 and secured to panel 86 by means of screws 60. The top surface of plates 88 and 90 are suitably flush with the top of panel 86, but both are covered by a layer 94 of Micarta which is suitably approximately $\frac{1}{16}$ inch thick. Conductors or plates 88 and 90 are electrically connected to the center conductor of a coaxial cable 20 corresponding to the similarly numbered cable in FIG. 1, that is, the cable extending to the transmitting portion or power source of the FIG. 1 circuit. The plates 88 and 90 to which such cable is joined are staggered or offset rather than being vertically aligned with the conductors or plates 50 and 52, the latter being connected by means of coaxial cable 22 to the receiving portion of the FIG. 1 circuit.

Directly opposite plates 50 and 52 are plates 96 joined to straps 98 and secured into matching apertures in panel 86 by means of screws 60. Again, the layer 94 of Micarta or the like covers plates 96. A bolt 100, formed of conducting material, extends through and makes electrical connection with each plate 96, and is also threadably received at the rear of shield cover 84 to make electrical connection therewith. The outer conductor of coaxial cable 20 also makes connection with cover 84 through connector 102 whereby plates 96 are connected to a point of common reference potential or ground in the FIG. 1 circuit.

Similarly, plates 104, suitably formed of steel, are joined to straps 106 and are secured into matching apertures in panel 54 by means of screws 60. Plates 104 are disposed in substantially vertical alignment with plates 88 and 90, and are connected by means of bolts 108 to the rear of shield cover 64. The outer conductor of coaxial cable 22 is joined to shield cover 64 by means of connector 110, and therefore plates 104 are also connected to a point of common reference potential or ground in the FIG. 1 circuit.

The detecting capacitor apparatus of FIGS. 10 through 13 is disposed relative to a conveyor 112 carrying material 114 thereon in a direction 116 as indicated in FIG. 12. The conveyor 112 is suitably a chain conveyor comprising a pair of chains disposed one at either side of the present apparatus, with the present apparatus being positioned therebetween. The direction of material flow relative to the plane of the present apparatus is illustrated in FIG. 11, and by arrow 116 in FIG. 12. Such material may comprise a plurality of boards, the moisture content of which is to be measured. Material 114 comprising a board would suitably extend longitudinally of the apparatus as shown in FIG. 10 or 11 so that a given board would be positioned above plates 88, 90, and 96 or the full length of shield covers 64 and 84. Of course, as the conveyor moves, successive boards would become successively positioned at such location, in close spaced relation to both sets of plates.

The member 66 is positioned vertically and secured by means of pin 70 so that shield cover 64 including the lower surface thereof formed by layer 62, is disposed in spaced relation above material 114 moving thereunder. Similarly, shield cover 84 is positioned with layer 94 in spaced relation underneath material 114 so that such material may pass between layers 64 and 94 without making any physical contact therewith. In the event of a pile-up of material, such that material thickness of a given range would not pass between layers 62 and 94, members 68 and 66 with shield cover 64 rotate to the left, as indicated by arrow 82 on the drawing, avoiding damage to the apparatus.

As thus illustrated and described, the plates or conductors comprising the detecting capacitor means or the like of the present invention, for example, plates 50 and 88, are offset or staggered from vertical alignment with one another. It is desired that such plates be offset relative to one another and spaced along such material as may be received therebetween to the extent that each of the plates is adjacent a substantial area of the material not directly facing the other plate. While the plates may overlap slightly in vertical alignment and still achieve desired results to some degree, it is preferred that they be completely non-aligned. As a result of this offsetting, an electrical path is established in the material under test, for example in a board having a predetermined moisture content, which path is predominately longitudinal of the material or board. It is postulated that high frequency energy, delivered from the FIG. 1 circuit via coaxial cable 20, is radiated, e.g. from plate 88 toward material 114, and then is primarily conducted along or in an electrical path comprising the moist material, to the vicinity of plate 50 where it will be received by plate 50 and coupled via coaxial cable 22 to the receiving portion of the FIG. 1 circuit. Longitudinal distance between plate 50 and plate 88, that is, the distance along or lengthwise of material 114. is fixed and does not vary once the apparatus according to the present invention is adjusted for operation. This distance, of course, remains fixed even through the thickness of the material 114 varies. As a result, it is found that the varying thicknesses of material or roughness of material and the like do not substantially affect the moisture indicating output. In other words, it is found that the output produced is a function of moisture content of the material, and is substantially less affected by material thicknesses. It is also found that the output produced is to a large degree independent of vertical position of material 114 in the apparatus.

Another factor in rendering the measurement independent of thickness, in addition to the factor related to the offset placement of conductors, is the provision of grounding conductors or plates 96 and 104 in spaced relation to the material under test and opposite plates 50 and 98 and the other plates. Thicker material, approaching plates 50 and 88 more closely, tends to provide a shorter, lower impedance path therebetween and therefore tends to result in an increased output signal. However, thicker material also tends to provide a shorter signal-shunting path by way of plates 96 and 104. The effects tend to balance one another so as to enhance the thickness-independence of the output.

The layers 62 and 94 of dielectric material covering the respective plates, although not necessary, are found to be quite desirable. Adding a fairly high dielectric insulating material over the conductor elements appear to minimize the effect of changes in the dielectric constant of the material, as may occur, for example, with different types of wood or with changes in the density of wood. When layers 62 and 94 are used, the output produced is more nearly a function of the resistance of the material path, that is, its moisture content. Also, layers 62 and 94 avoid inadvertent contact between the material and the plates.

While a pair of plates connected to the power source and a pair of offset receiving plates are illustrated, it is understood that various numbers, or one, of each of such plates may be employed, or one transmitting plate may be employed with two receiving plates, or the reverse. However, it has been found desirable to provide a longitudinal row or array of conductors extending along the length of the measured material whereby a greater length of the material may be tested. Of course, plural units can be provided and interconnected either substantially in parallel or employing a commutator means as illustrated in FIGS. 3, 4, and 8.

Component 118 connected between the central conductor of coaxial cable 22 and the grounded shield cover 64 in FIG. 10 comprises a resistor for widening the response of the receiving circuit. Component 120 it a tuning capacitor which may be employed to increase the voltage at the end of cable 20 within shield cover 64. In the present discussion, the plates 88 and 90 have been referred to as connected through coaxial cable 20 to the power source while plates 50 and 52 have been indicated as connected to the receiving circuitry through coaxial cable 22. It is understood the reverse can be true if desired, but the illustrated arrangement is preferable because the powered apparatus is then stationary and requires substantially no adjustment.

Figure 14:
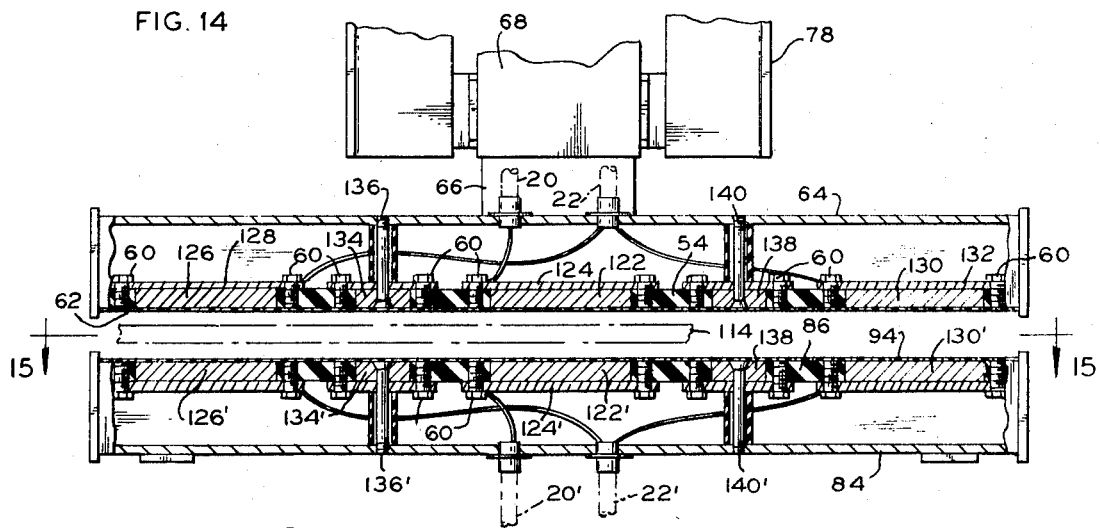
FIG. 14 is an end view partially in cross section of other conductor means which may be employed according to a preferred embodiment of moisture detection apparatus according to the present invention.
Figure 15:
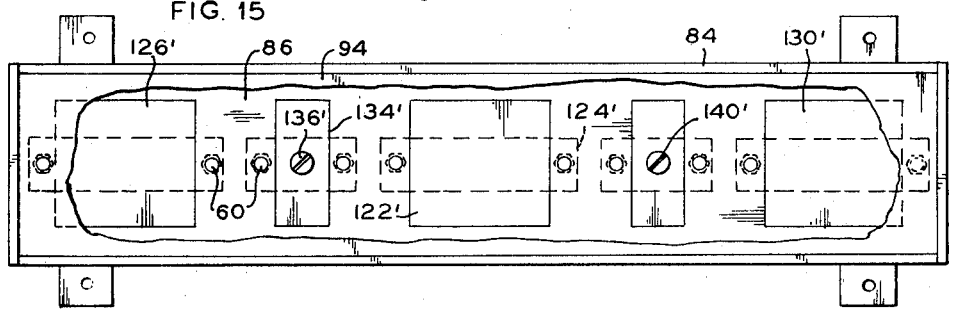
FIG. 15 is a plan view of a portion of the FIG. 14 apparatus taken at 15—15 in FIG. 14, and partially broken away.

A second detecting capacitor apparatus according to a preferred embodiment of the present invention is illustrated in FIGS. 14 and 15, wherein like parts are referred to with like reference numerals. The details of the swingable support for upper shield cover 64, and the back stop therefor, have been eliminated from this view, but it is understood they may be identical to the structure illustrated in FIGS. 10, 12, and 13. Also, referring to FIGS. 14 and 15, a coaxial cable 20 and a coaxial cable 20' from power source 18 in FIG. 1 is connected to both upper and lower portions of the apparatus, it being understood these cables are connected in parallel to receive power from such power source. Similarly, coaxial cables 22 and 22' both extend to deliver signals to the receiving portion of the FIG. 1 apparatus, and in particular to transistor 24 thereof. Cables 22 and 22' are suitably connected in parallel to transistor 24. The center conductor of coaxial cable 20 is connected to a conductor or plate 122 which may be formed of steel and which is secured to strap 124. Screws 60 secure strap 124 to panel 54 such that plate 122 is received in an aperture in panel 54. Panel 54 is again formed of insulating dielectric material, for example, Micarta, and is covered with a thin layer 62 of Micarta or the like which also covers plate 122. Similarly, coaxial cable 20' is connected to conductor or steel plate 122' which is disposed in a similar manner in an aperture in panel 86', the latter being formed of Micarta or similar material and covered with a thin layer 94 of Micarta or the like. Plate 122' is suitably vertically aligned with the position of plate 122.

Coaxial cable 22 connects to a conductor or plate 126 which may be formed of steel, joined to strap 128 for positioning plate 126 in an aperture in panel 54 at a position offset or longitudinally removed from plate 122. The central conductor of coaxial cable 22 is similarly connected to a plate 130 suitably formed of steel, retained in an aperture in panel 54 by means of a strap 132 wherein the conductor or plate 130 is also longitudinally removed from conductor or plate 122, but on the opposite side thereof from plate 126 with the three plates desirably being aligned in a row or array. Plates 126' and 130' are located below plates 126 and 130, and are similarly connected to cable 22' and retained in panel 86 at positions on either side of plate 122'.

Between plates 122 and 126 and desirably in alignment therewith is located a conductor or plate 134 inserted through panel 54 in the manner of the other plates hereinbefore described, and electrically joined to shield cover 64 by means of bolt 136. Therefore, plate 134 resides electrically at a point of common reference potential or ground potential relative to the FIG. 1 circuit or at a potential point different from the center terminal conductors of coaxial cables, 20, 20', 22, or 22', baceuse of the connection of the outer conductors of coaxial cables 20 and 22 with shield cover 64. Another grounding plate 138 is similarly disposed between plate 122 and plate 130 and is joined electrically to shield cover 64 through bolt 140, and therefore through the coaxial cable outer conductors to the FIG. 1 circuit ground. Also, conductor or plate 134', connected electrically to shield cover 84 and therefore circuit ground, is disposed between plate 122' and plate 126', and below plate 134, while conductor or plate 138' is similarly connected and disposed between plate 122' and plate 130', while being below plate 138.

In the apparatus of FIGS. 14 and 15, as in the apparatus of FIGS. 10 through 13, the conductors or plates connected to the receiving circuitry are longitudinally offset from the conductors or plates connected to the radio frequency power source. In the apparatus of FIGS. 14 and 15, however, transmitting and receiving plates are disposed on the same side of material 114 while a similar set of conductors or plates are preferably disposed on the opposite side. This arrangement is found to be superior in a number of respects. Since both input and output cables lead to the same shield cover, the overall apparatus has been found less sensitive to possible electrical contact of nearby objects, as when the apparatus is physically positioned or adjusted by a person. Furthermore, although the material moving relative to the apparatus of FIGS. 10 through 13 is not susceptible to a great degree of vertical position variation, and while the apparatus of FIGS. 10 through 13 is rather insensitive to such variation, nevertheless the apparatus of FIGS. 14 and 15 is even less sensitive to material position. The latter property will be explained with the aid of FIG. 16, schematically illustrating a side view of the apparatus.

Figure 16:
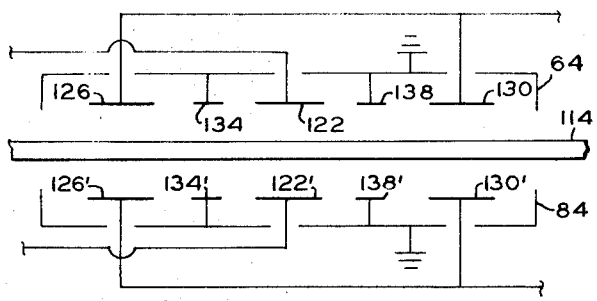
FIG. 16 is a schematic diagram illustrative of the electrical conductor configuration of the FIG. 14 apparatus.

Referring to FIG. 16, if material 114, for example a piece of damp lumber, moves vertically towards plates 122 and 126 due to a warp in the lumber, grounded plate 134 tends to capacitively shunt to ground a portion of the signal, which would otherwise pass from plate 122 to 126 via closer spacings to the lumber. Therefore, output tends to be independent of material position. Moreover, as in the construction of FIGS. 10 through 13, if material 114 changes in thickness, plate 134 has a similar shunting effect so as to prevent an undesired increase in output indication. Of course, the other plates and grounding plates operate similarly.

Figure 17:
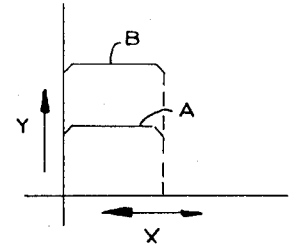
FIG. 17 is a graph of output amplitude variation, Y, of electric signal means, as a function of position, X, for material positioned relative to a FIG. 14–15 apparatus connected to such signal means for, A, dry material, and, B, wet material.

FIG. 17 illustrates results obtained by the apparatus of FIGS. 14 and 15. In FIG. 17, comprising a graph of output Y, for example as registered on meter 34 in FIG. 1, vs. vertical position X of material 114, curve A illustrates the output for a sample of dry material, while curve B illustrates an output for a sample of wet material. As can be seen, the output is primarily a function of the moisture content, and not of material position, unless the material approaches very closely to the array of plates on either side. When the plates are closely approached, as illustrated at the left and right ends of the curves, the shunting effect of the grounding plates tends to cause the output to fall off slightly. In actual practice, however, any vertical movement of material takes place within the straight portions of the curves.

The electrical connections of the plates may be reversed in the apparatus of FIGS. 14 and 15, or, the electrical connections of one set of plates may be reversed, for example, the lower set, with somewhat similar results. In the latter case, it will be seen that transmitting and receiving plates would be directly opposite one another across the material. However, it is found that sufficient longitudinal conduction takes place between a transmitting plate of one juxtaposed pair and a receiving plate longitudinally removed therefrom, through a longitudinal path in the material, so that at least some degree of independence from output change due to thickness variation is retained. The apparatus of FIGS. 14 and 15 is also found to be more sensitive than the apparatus of FIGS. 10 and 13 and, for a given signal strength, transmitting and receiving plates can be longitudinally spaced by a greater distance, so as to result in enhanced thickness compensation.

In adjusting the apparatus for operation, reference is again made to FIG. 1 circuit for a suitable procedure. Power is applied, and potentiometer 27 is adusted until no power is passed through detecting capacitor 21, that is, so that the power passing through a detecting capacitor apparatus 21 with no material located therewithin is insufficient to exceed the bias provided by potentiometer 27. Potentiometer 36 is then adjusted so that meter 34 reads an alarm percentage of moisture, or that value of moisture density for which it is desired that alarm 33 operate. Potentiometer 41 is then set to the point at which alarm 33 barely starts to activate and then meter 34 is returned to zero by means of operation of meter zoning potentiometer 36. The apparatus will at this time be adjusted to actuate alarm 33 whenever the alarm value of moisture is reached. A sample of material, containing a low known percentage of moisture, is now placed in detecting capacitor apparatus 21, and potentiometer 27 is adjusted until meter 34 reads such known moisture percentage. The sample is now removed, and a second sample having a high known moisture content is placed in the detecting capacitor, and control 38 is adjusted until meter 34 reads the scaled value of the moisture content of the second sample. Since the control settings affect each

13 other to some degree, repeat adjustments are usually necessary until the correct calibration of meter 34 is achieved with the alarm operating at the desired alarm value. Once the apparatus is adjusted, minor corrections can be more easily accomplished at any time for continuous operation of the apparatus.

While I have shown and described several embodiments of my invention, it will be apparent to those skilled in the art that many changes and modifications may be made without departing from my invention in its broader aspects. For instance, the circuit of FIG. 1 is an example of one circuit which may be used with the apparatus of the present invention, and more complex circuits may be substituted therefor.

I claim:

1. Apparatus for measuring the moisture content of material comprising:
    a detecting capacitor having at least first and second plate means for disposition in facing relation to said material so that electrical properties of the path between said plate means are affected by the moisture in said material,
    means mounting said plate means relative to the position of said material so that principal areas of said plate means where they face such material are spaced from said material in non-contacting relation thereto, but wherein an edge of a first plate means contacts said material,
    and electric signal means having first and second terminals coupled respectively to said first and second plate means and responsive to the electrical path between said first and second terminals for indicating relative moisture in said material,
    wherein said mounting means includes a means for pivoting said first plate means, said first plate means having a face adjacent said material and being pivoted about an axis parallel to and rearward of its face and substantially opposite the second of said plate means on the opposite side of the material from the second of the plate means,
    wherein said first plate means is adapted to be upraised at a lower portion thereof and be turned by said material about said axis for compensating for variations in thickness of said material between said plate means,
    and wherein the second of said plate means is foreshortened relative to the first of said plate means toward the said axis of the latter.

2. Apparatus for measuring the moisture content of material comprising:
    a detecting capacitor having at least first and second plate means for disposition in facing relation to said material so that said electrical properties of the path between said plate means are affected by the moisture in said material,
    means mounting said plate means relative to the position of said material so that at least principal areas of said plate means where they face such material are spaced from said material in non-contacting relation thereto on opposite sides thereof, said mounting means comprising means for pivoting one of said plate means so that only an edge thereof contacts said material, said one of said plate means having a face adjacent said material and being pivoted about an axis parallel to and rearward of its face, and wherein the other of the plate means on the other side of the material is foreshortened relative to the one of the plate means toward the axis of the latter,
    and electric signal means having first and second terminals coupled respectively to said first and second plate means and responsive to the said electrical path between said first and second terminals for indicating relative moisture in said material,
    wherein at least a first of said plate means comprises a series of separate plates each facing said second of said plate means,

14 and commutating means consecutively connecting said separate plates to said electric signal means,
    said commutating means comprising a multivibrator having elements conductive at different times for enabling the coupling of different of said plates to said electric signal means.

3. Apparatus for measuring the moisture content of material comprising:
    a detecting capacitor having at least first and second plate means for disposition in facing relation to said material so that electrical properties of the patth between said plate means are affected by the moisture in said material,
    means mounting said plate means relative to the position of said material so that at least principal areas of said plate means where they face such material are spaced from said material in non-contacting relation thereto,
    and electric signal means having first and second terminals coupled respectively to said first and second plate means and responsive to the electrical path between said first and second terminals for indicating relative moisture in said material, said electric signal means comprising transmitting means including an oscillator coupled to one of said terminals and receiving means including a detector coupled to the other of said terminals, said electric signal means being substantially continuously operative to transmit an R.F. signal along a longitudinal path in said material,
    wherein said plate means comprise substantially flat plates for disposition in spaced substantially parallel relation to said material with the material forming the dielectric of said detecting capacitor, said material providing an electrical path therealong between said plates, one of said plates being mounted entirely in offset relation to the other so that said plates do not face one another,
    said apparatus further including substantially flat grounding plates disposed in substantially parallel relation to said material, in capacitive relation to the material, and in shunting capacitive relation to the path between the differently connected first and second plate means in the material to partially shunt an electric signal to ground, said grounding plates having substantially the same spacing from said material as said plate means.

4. Apparatus for measuring the moisture content of material comprising a detecting capacitor having a pair of spaced plates, so arranged in facing relation that material may pass between the said plates,
    at least a first of said plates being movable in response to variations in the thickness of said material, wherein material of greater thickness is effective to move the said first of said plates farther from the second of said plates so that said material may be accommodated between said plates, while material of lesser thickness allows closer spacing of said plates,
    means mounting the said first of said plates so that the movement of said first of said plates away from the second of said plates in response to a material of greater thickness increases the facing projected area between the two plates, while the position of the first of said plates closer to the second of said plates on either side of a material of lesser thickness decreases the projected area between the two plates whereby the movement of said movable plate tends to compensate for the variation in thickness of material and plate spacing,
    and electrical signal means responsive to the electrical properties of the path between said plates for indicating the moisture in said material.

5. The apparatus according to claim 4 wherein both plates are movable.

6. The apparatus according to claim 4 wherein said electric signal means includes biasing means for substantially inhibiting the operation thereof for moisture content in said material less than a predetermined value.

7. The apparatus according to claim 4 wherein said electric signal means comprises electric signal generating means connected to one of said plates, electric signal receiving means connected to another of said plates, and adjustable biasing means for determining the output of said receiving means relative to moisture content in said material.

8. Apparatus for measuring the moisture content of material comprising:
a pair of conductor plate means,
means supporting said conductor plate means in spaced relation to the position of said material with elongated flat faces in substantially parallel relation to said material and in offset relation to one another so that each of said conductor plate means has an elongated flat face disposed toward at least a predominately different portion of said material, neither of said plate means having a flat face area entirely juxtaposed with respect to the other plate means, with the major electrical path between said conductor plate means extending a substantially fixed distance from one conductor plate means and along said material to the other conductor plate means so as to be principally affected by the moisture in said material while being substantially less dependent on thickness variations of said material,
a radio frequency power source including an oscillator for generating an R.F. signal, means coupling said signal to one of said conductor plate means,
radio receiving means including a detector coupled to the other of the conductor plate means for detecting said R.F. signal, and means for ascertaining when said detector detects a signal above a given value,
said power source and said receiving means being continuously operative during operation of said apparatus for continuously transmitting said R.F. signal longitudinally along said path in said material between said conductor plate means when said material is present,
and additional conductive plate means, comparable in size with each of said pair of conductor plate means, and disposed with an elongated flat face in substantially parallel relation to said material in capacitive relation thereto and spaced from said material by substantially the same distance as said pair of plate means are spaced from said material, said additional plate means having a shunting capacitive relation to the path between said pair of plate means by being coupled to a circuit point different from said pair of plate means for reducing said electrical signal in order to compensate for varying positions of said material.

9. The apparatus according to claim 8 wherein each of said pair of conductor plate means is supported for positioning on the same side of said material in spaced relation thereto.

10. Apparatus according to claim 9 further including a similar array of offset conductor means on the opposite side of said material, and being similarly coupled to said power source and receiving means.

11. Apparatus according to claim 9 wherein said additional conductive plate means is disposed between the conductor plate means of said pair on the same side of said material in spaced relation to said material.

12. Apparatus according to claim 8 wherein each of said pair of said conductor plate means is located for positioning on an opposite side of said material.

13. The apparatus according to claim 12 wherein said additional conductive plate means is disposed on the opposite side of said material from at least one of said pair of conductor plate means.

14. Apparatus for measuring the moisture content of material comprising:
a fixed array of plates each having an elongated flat face, means for supporting said plates in a row and spaced substantially the same distance from said material on one side of said material, said plates each presenting said elongated flat face in substantially parallel relation to said material to form an effective capacitor therewith,
a second array of plates also disposed in a row in spaced relation to said material, for location on the opposite side of said material, said second array of plates normally being juxtaposed with respect to said first array of plates, and having elongated flat faces parallel to and spaced substantially the same distance from said material,
means for supporting said second array of plates for rotatable movement out of such juxtaposed position in response to passage of material exceeding the spacing between said second array and said material,
a conveyor means for conveying said material between said arrays of plates,
radio frequency transmitting means including an R.F. oscillator coupled to first ones of said plates, radio receiving means including a detector coupled to other ones of said plates offset with respect to the first, said transmitting and receiving means being substantially continuously operative to transmit an R.F. signal along a longitudinal path in said material,
and means grounding every other plate in each said array whereby the other plates in each said array are separated thereby.

15. Apparatus according to claim 14 wherein the plates in each said array alternate between a plate connected to a transmitting means and a plate connected to a receiving means, with a grounded plate being located therebetween.

16. Apparatus according to claim 15 wherein each plate of each said array is juxtaposed in substantial alignment with an opposite plate similarly connected.

17. Apparatus according to claim 14 wherein each non-grounded plate of one of said arrays is connected to said transmitting means while each non-grounded plate of the second array is connected to said receiving means, said grounded plates being disposed opposite transmitting and receiving connected plates of the opposite array.

18. Apparatus according to claim 14 wherein a thin layer of dielectric material is disposed between the plates comprising each said array and the said material.

19. Apparatus for measuring moisture content of material comprising:
a pair of conductor means,
means for supporting said conductor means in spaced relation to said material in offset relation with respect to one another,
electrical means for coupling a radio frequency signal between said pair of conductor means for measuring the moisture content of said material, said electrical means comprising radio frequency transmitting means including an R.F. oscillator coupled to one of said pair of conductor means and radio receiving means including a detector coupled to the other of said pair of conductor means, said transmitting and receiving means being substantially continuously operative to transmit an R.F. signal along a longitu- path in said material,
and additional means for providing a shunting path for the said signal as the spacing varies between said material and said additional conductor means to compensate for positional variations of said material, said additional means having substantially the same spacing to said material as said pair of conductor means,
said pair of conductor means and said additional means comprising conductive plates having flat sides substantially parallel to said material.

(References on following page)

References Cited

UNITED STATES PATENTS

| | | | |
|---|---|---|---|
| 1,878,109 | 9/1932 | Clark | 324—61 |
| 2,574,261 | 11/1951 | Hagan | 324—61 |
| 3,375,716 | 4/1968 | Hersch | 324—61 X |
| 1,984,166 | 12/1934 | Walter | 324—61 XR |
| 2,428,700 | 10/1947 | Eilenberger | 324—61 |
| 2,562,575 | 7/1951 | Raesler | 324—61 |
| 2,572,226 | 10/1951 | Walstrom | 219—47 |
| 2,653,298 | 9/1953 | McKinley | 324—65 |
| 2,718,620 | 9/1955 | Howe | 324—61 |
| 2,726,366 | 12/1955 | Rogers | 324—61 |
| 2,782,367 | 2/1957 | Dallas | 324—61 |
| 2,942,248 | 6/1960 | Huggins. | |
| 2,950,436 | 8/1960 | Butticaz et al. | 324—61 |
| 3,209,247 | 9/1965 | Mead et al. | 324—61 |
| 3,284,706 | 11/1966 | Benson | 324—61 |
| 2,829,340 | 4/1958 | Lipke | 324—61 |
| 3,339,137 | 8/1967 | Perry | 324—61 |

FOREIGN PATENTS

| | | |
|---|---|---|
| 1,359,960 | 12/1964 | France. |
| 955,157 | 4/1964 | Great Britain. |
| 236,230 | 10/1961 | Australia. |
| 673,684 | 11/1963 | Canada. |

OTHER REFERENCES

Brown: "Dielectric Sensing Device," IBM Bulletin, vol. 2, No. 3, October 1959, p. 1.

Deyerling: German printed application No. H 11,698, Dec. 22, 1955.

EDWARD E. KUBASIEWICZ, Primary Examiner